US012297689B2

(12) United States Patent
Lipsky

(10) Patent No.: US 12,297,689 B2
(45) Date of Patent: May 13, 2025

(54) DEVICE AND METHOD FOR SECURING FRAMES

(71) Applicants: Reinhard Kaindlbauer, Gratkorn (AT); Franz Lipsky, Großpesendorf (AT)

(72) Inventor: Franz Lipsky, Großpesendorf (AT)

(73) Assignees: Reinhard KAINDLBAUER, Gratkorn (AT); Franz LIPSKY, Großpesendorf (AT)

( * ) Notice: Subject to any disclaimer, the term of this patent is extended or adjusted under 35 U.S.C. 154(b) by 314 days.

(21) Appl. No.: 16/981,070

(22) PCT Filed: Mar. 12, 2019

(86) PCT No.: PCT/EP2019/056176

§ 371 (c)(1),
(2) Date: Nov. 3, 2020

(87) PCT Pub. No.: WO2019/175184

PCT Pub. Date: Sep. 19, 2019

(65) Prior Publication Data

US 2022/0259915 A1 Aug. 18, 2022

(30) Foreign Application Priority Data

Mar. 15, 2018 (EP) .................................... 18162032

(51) Int. Cl.
*E06B 1/60* (2006.01)

(52) U.S. Cl.
CPC .................................. *E06B 1/6061* (2013.01)

(58) Field of Classification Search
CPC . E06B 1/20; E06B 1/56; E06B 1/6046; E06B 1/6061; E06B 1/603
See application file for complete search history.

(56) References Cited

U.S. PATENT DOCUMENTS 899,259 A * 9/1908 Ohnstrand ................ E06B 1/20 49/505
1,855,470 A * 4/1932 Bilton ................... E06B 1/6061 52/212

(Continued)

FOREIGN PATENT DOCUMENTS

CN 2167493 6/1994
CN 1837566 9/2006

(Continued)

OTHER PUBLICATIONS

Int'l Search Report (Form PCT/ISA/210) conducted in Int'l Appln. No. PCT/EP2019/056176 (Jun. 6, 2019).

(Continued)

*Primary Examiner* — James M Ference
(74) *Attorney, Agent, or Firm* — GREENBLUM & BERNSTEIN, P.L.C.

(57) ABSTRACT

A device for securing frames, including a retaining plate and two clamping angles, the clamping angles being retained on the retaining plate so they can shift in relation thereto. To ensure simple handling, the angles are arranged on the retaining plate rotationally fixed and each includes at least one clamping element and at least one connecting piece. Methods are included for securing a frame to a wall, whereby one angle is connected to a retaining plate that is secured to an inner side of the frame. To secure the frame simply, it is inserted into a wall opening and a second angle is connected to the plate in a rotationally fixed manner across from the first angle, after which the first and second angles are connected using at least one adjusting means and a span width is reduced until a sufficient clamping force on the wall is reached.

17 Claims, 5 Drawing Sheets

(56) References Cited

U.S. PATENT DOCUMENTS

| | | | | | | |
|---|---|---|---|---|---|---|
| 1,926,673 | A | * | 9/1933 | Gregg | E06B 1/603 | 52/214 |
| 2,633,946 | A | * | 4/1953 | Huizenga | E06B 3/88 | 52/800.18 |
| 3,119,155 | A | * | 1/1964 | Schlegel | E06B 1/6061 | 49/495.1 |
| 3,156,331 | A | * | 11/1964 | Sklar | E06B 3/9885 | 49/505 |
| 3,222,833 | A | * | 12/1965 | Woodrum | E06B 3/9885 | 52/211 |
| 3,248,833 | A | * | 5/1966 | Sklar | E06B 1/6061 | 52/211 |
| 3,250,049 | A | * | 5/1966 | Sklar | E06B 1/6061 | 52/211 |
| 3,585,770 | A | * | 6/1971 | Maizler | E06B 1/6061 | 403/231 |
| 3,641,722 | A | * | 2/1972 | Schmitt | E06B 1/603 | 49/505 |
| 3,793,788 | A | * | 2/1974 | Collins | E06B 1/20 | 52/214 |
| 3,924,373 | A | * | 12/1975 | Lizdas | E06B 1/6069 | 52/211 |
| 4,034,513 | A | * | 7/1977 | Richardson | E06B 1/64 | 49/504 |
| 4,179,849 | A | * | 12/1979 | Kuffner | E06B 1/603 | 49/505 |
| 4,223,494 | A | * | 9/1980 | Wendt | E06B 1/32 | 49/504 |
| 4,281,481 | A | * | 8/1981 | Wendt | E06B 5/161 | 49/504 |
| 4,873,804 | A | * | 10/1989 | Kukke | E06B 1/6076 | 411/116 |
| 4,878,325 | A | * | 11/1989 | Van Tuyl | E06B 1/20 | 49/505 |
| 5,070,651 | A | * | 12/1991 | Jeter | E06B 1/045 | 49/505 |
| 7,340,866 | B1 | * | 3/2008 | Smith | E06B 1/30 | 52/745.15 |
| 7,533,503 | B2 | * | 5/2009 | Wang | E06B 1/30 | 49/504 |
| 8,650,818 | B1 | * | 2/2014 | Smith | E06B 1/603 | 52/211 |
| 2006/0048466 | A1 | * | 3/2006 | Darnell | E06B 1/60 | 52/204.1 |
| 2007/0022699 | A1 | * | 2/2007 | Wang | E06B 1/30 | 52/656.4 |
| 2022/0259915 | A1 | * | 8/2022 | Lipsky | E06B 1/6061 | |

FOREIGN PATENT DOCUMENTS

| | | | | | |
|---|---|---|---|---|---|
| CN | 201381742 | | | 1/2010 | |
| CN | 101748955 | | | 6/2010 | |
| DE | 1012488 | | | 7/1957 | |
| DE | 2342837 | A | * | 3/1975 | E06B 1/603 |
| DE | 2451813 | A1 | * | 5/1976 | |
| DE | 3323498 | | | 1/1985 | |
| DE | 3616453 | | | 11/1986 | |
| DE | 3900608 | C | * | 7/1990 | E06B 1/603 |
| DE | 4033474 | A1 | * | 4/1992 | E06B 1/603 |
| DE | 19900095 | C1 | * | 3/2000 | E06B 1/603 |
| DE | 10050780 | B4 | * | 5/2006 | E06B 1/20 |
| DE | 102013005462 | A1 | * | 10/2014 | E06B 1/02 |
| EP | 389809 | | | 10/1990 | |
| EP | 2 287 431 | | | 2/2011 | |
| GB | 908985 | A | * | 2/1961 | |
| NL | 8 403 967 | | | 7/1986 | |
| RU | 2038457 | | | 6/1995 | |
| RU | 2469165 | | | 12/2012 | |
| SE | 450873 | B | * | 8/1987 | E06B 1/20 |

OTHER PUBLICATIONS

Int'l Written Opinion (Form PCT/ISA/237) conducted in Int'l Appln. No. PCT/EP2019/056176 (Jun. 6, 2019).

China Search Report conducted in China Appln. No. 201980032016.1 (Feb. 8, 2022) (w/ translation).

China Office Action conducted in China Appln. No. 201980032016.1 (Feb. 16, 2022) (w/ translation).

Russia Search Report conducted in Russia Appln. No. 2020133902/03 (Apr. 26, 2022).

China Search Report conducted in China Appln. No. 201980032016.1 (Oct. 28, 2022) (w/ translation).

China Office Action conducted in China Appln. No. 201980032016.1 (Nov. 3, 2022) (w/ translation).

* cited by examiner

DEVICE AND METHOD FOR SECURING FRAMES

The invention relates to a device for securing frames, comprising a retaining plate and two cooperating clamping angles, wherein a first clamping angle and/or a second clamping angle are arranged on the retaining plate such that they can shift relative thereto, so that a span width of the clamping angles can be changed.

The invention also relates to a use of a device of this type.

The invention furthermore relates to a method for securing a frame to a wall, wherein a first clamping angle is connected to a retaining plate and the retaining plate is secured to an inner side of the frame.

Finally, the invention relates to a further method for securing a frame to a wall, wherein a retaining plate with an integrated clamping angle is secured to an inner side of the frame.

The securing of frames to a wall or an installation of frames in a wall opening typically occurs by means of PU foam, wherein the frame is first secured temporarily in the wall opening by means of one or more braces and/or shims, for example. The PU foam can then be introduced between the frame and the wall. This introduced PU foam must then cure for approximately one to two hours before excess foam can be removed and the installation of the frame, in particular with an attachment of molding or trim, can be continued.

A disadvantage here is, on the one hand, that the installation of frames normally takes a long time due to a waiting time caused for the most part by the PU foam. On the other hand, a quality of the securing is dependent on a temperature and a humidity. Thus, for example, the installation of a frame at low temperatures, for example below 4° C., and/or at a high relative humidity is not possible or only possible to a limited extent.

In addition, commercially available PU foam, in particular a two-component foam, comprises substances which are harmful to health and the environment, for which reason a disposal of empty PU foam cans is costly, since these cans must be discarded as hazardous waste.

A further disadvantage is that the PU foam, in particular the two-component foam, can continue to expand following installation, whereby installed frames can shift or warp, and it may no longer be possible to close or open an installed door. As a result, an impacted frame must be removed and replaced, which leads to considerable additional costs and necessitates an enormous expenditure of time.

To avoid a use of PU foam, a clamp for securing a door jamb liner or a frame to a wall is known from document DE 1 012 448 B, wherein the frame is screwed to a retaining plate and after which the retaining plate is secured to a wall face by means of wall anchors. However, a handling of a device of this type has proven especially difficult, which is why a device of this type has not been used as of yet.

Thus, there is still a need for a device and method for the quick, simple and environmentally sustainable securing of a frame to a wall.

It is therefore the object of the invention to specify a device of the type named at the outset, with which a simple and environmentally sustainable securing of a frame in a wall opening can be achieved.

A further object of the invention is to specify a use for a device of this type.

It is also an object of the invention to specify a method of the type named at the outset, with which a frame can be secured in a wall opening in a simple and sustainable manner.

Finally, it is an object of the invention to specify a further method of the type named at the outset, with which a frame can be secured in a wall opening in a simple and sustainable manner.

The first object of the invention is attained with a device of the type named at the outset, which is embodied such that the clamping angles are arranged on the retaining plate in a rotationally fixed manner and each comprise at least one planar clamping element and at least one connecting piece.

One advantage obtained with the invention can in particular be seen in that a simple handling of the device is achieved through a rotationally fixed arrangement of the clamping angles on the retaining plate. If a first clamping angle and/or a second clamping angle are arranged on the retaining plate in a rotationally fixed manner, the retaining plate can be connected, preferably screwed, to the frame, for example, wherein the clamping angles, primarily the first clamping angle, are in a proper position and/or orientation for the securing of the frame. Thus, a device according to the invention can be secured quickly and without problems by one person alone, since there is no longer a need to pay attention to the orientation of the first clamping angle during an attachment of the second clamping angle. In contrast, with the device according to the prior art, connecting elements used for a connection of the wall anchors are embodied to be round or tubular, wherein these connecting elements are slid into a corresponding tube on the retaining plate. In addition, the frame can be loaded immediately following installation; for example, a door can be hung in place immediately following installation, in particular without any waiting time. Furthermore, planar clamping elements provide a largest possible area for contact with the wall or a wall face.

It is also advantageous if the clamping element and the at least one connecting piece form an angle of approximately 90°. It is thus ensured that the clamping elements grip and/or rest on the wall on both sides, in particular two wall faces, in order to keep the frame in a desired position. Here, it is typically provided that the clamping element and the at least one connecting piece are connected by a segment which runs preferably at a slant. This segment can form an angle between 10° and 80°, in particular an angle of 45°, with the at least one connecting piece, one of the connecting pieces, and/or with the clamping element. Alternatively, this segment can be embodied to be bent or curved.

In addition, it is beneficial if the at least one connecting piece has a cross section which is essentially polygonal, preferably rectangular. It is thus possible to provide a single connecting piece and nevertheless achieve a rotationally fixed mounting of the clamping angle on the retaining plate. A rotationally fixed mounting can likewise be achieved with a connecting piece having an oval cross section. Alternatively, two connecting pieces can be provided which can be embodied in any desired manner, in particular also round.

To change or set the span width of the clamping angles and, for example, reduce a maximum span width, it is advantageous if a first clamping angle comprises, preferably at a first end, at least one female thread for respectively receiving one adjusting means, for example a screw, and a second clamping angle respectively comprises, preferably on the clamping element, a connecting hole that corresponds to the female thread. An adjusting means, such as a screw for example, can thus be guided through the connecting hole corresponding to the female thread and screwed into the female thread, whereby the two clamping angles are connected and a maximum span width is set. It is beneficial if the hole has a smaller diameter than a screw head of a screw which is screwed into the female thread. In this case, the screw head preferably rests on the clamping element so that by screwing in the screw further or by actuating the adjusting means, a distance between the two clamping elements, or the span width, is reduced.

To firmly connect the clamping angles to the wall, it can be provided that at least one of the clamping elements comprises multiple holes for receiving one fastener each. Alternatively or additionally, a U-shaped profile, such as a rubber cap, can be placed on the clamping element to prevent the device from slipping, for instance on smooth surfaces such as a tiled wall, for example. It has proven effective that the clamping element comprises at least two, particularly preferably three holes in order to connect the clamping element to the wall in a fixed and, in particular, a rotationally fixed manner.

In addition, it is beneficial if the retaining plate comprises a central surface that is flanked by two contact surfaces, wherein the retaining plate is respectively beveled between the central surface and a contact surface. In this manner, a space is provided between the retaining plate and the frame, into which space the clamping angles, in particular with the connecting pieces thereof, can be slid. Alternatively, one receiving element each can be provided on the retaining plate for the connecting pieces. The receiving element can, for example, comprise at least one tube or at least one guide channel into which one connecting piece each can be inserted. To ensure a rotationally fixed connection in this case, it can be provided that the clamping angles respectively comprise at least two rod-shaped, for example round, connecting pieces, and wherein corresponding guide channels or tubes into which the connecting pieces can be inserted are respectively provided on the retaining plate.

It is also advantageous if the retaining plate comprises at least one guide element for the clamping angles. As a result of the guide element(s), it is ensured that the clamping angles can be slid into the retaining plate, or in between the retaining plate and the frame, in a proper position. Additionally, the connecting piece of the first clamping angle can be clamped between the guide elements so that the retaining plate is connected to the clamping angle in a rotationally fixed manner.

To prevent a sliding by the device on rough substrates or wall faces, it is advantageous if the clamping angles comprise a toothing on a second end, in particular on the clamping element. This toothing is preferably positioned on a top side of the clamping element and can, for example, dig into a wall face, whereby the device is fixed. For this purpose, it has proven effective that an upper part of the clamping element is sloped in the direction of the guide elements. To protect the tiled wall or another surface against damage from the toothing, such as scratching for example, the U-shaped profile, in particular the rubber cap, can be pulled over the toothing or placed thereon.

In order to further simplify a handling of the device, it can be provided that the first clamping angle is embodied in one piece with the retaining plate or is permanently connected thereto. This eliminates an assembly of the first clamping angle with the retaining plate during a securing of the device to the frame.

The further object is obtained with a use of a device of this type for securing a frame to a wall. One advantage in particular results from a securing being able to occur independent of a temperature and a humidity, and the device used for this purpose being less harmful to health and the environment. In addition, the installed frame can be removed and, for example, replaced without any residues or damage. The devices already used can then be used again for a replacement frame.

The first method-related object is attained with a method of the type named at the outset, wherein the frame is inserted into a wall opening, whereupon a second clamping angle is connected to the retaining plate in a rotationally fixed manner across from the first clamping angle, after which the first clamping angle and the second clamping angle are connected using at least one adjusting means and a span width is reduced until a sufficient clamping force on the wall is reached in order to fix the frame to the wall.

One advantage obtained with this method can in particular be seen in that the device can be easily secured to the frame, the frame can be easily inserted into the wall opening, and the frame can be clamped in place on the wall in a simple manner. This method can be performed quickly and carried out by one person alone.

The further method-related object is attained with a further method of the type named at the outset, wherein the frame is inserted into a wall opening, whereupon a second clamping angle is connected to the retaining plate in a rotationally fixed manner across from the first clamping angle, after which the first clamping angle and the second clamping angle are connected using at least one adjusting means and a span width is reduced until a sufficient clamping force on the wall is reached in order to fix the frame to the wall.

This method can also be performed quickly and carried out by one person alone, since the device can be easily secured to the frame, the frame can be easily inserted into the wall opening, and the frame can be clamped in place on the wall in a simple manner.

It is furthermore beneficial if a connecting piece of the second clamping angle is slid in between the retaining plate and the frame. In this manner, the connecting piece is fixed by the retaining plate itself, whereby a weight of the entire device is reduced. Alternatively, one or more guide channels for the first and/or second clamping angle can be provided on the retaining plate, for example, into which guide channels the clamping angle(s) can be slid.

In addition, it is beneficial if the frame is aligned before the span width is reduced, in particular to a minimum. In this case, for example, the span width can first be reduced a small distance so that the frame holds in the wall opening and is preferably fixed perpendicularly to a wall opening boundary. The frame can subsequently be adjusted, normally forwards and backwards or parallel to the wall opening boundary, after which the span width is further reduced so that the frame holds in the wall opening in an essentially fixed position. If necessary, a further precision adjustment of the frame can occur if the retaining plate and the clamping angles are not yet tightly connected to one another. For this purpose, the frame can be moved forwards and backwards in the wall opening together with the retaining plate, in particular relative to the clamping angles and along the connecting pieces.

It is also advantageous if the retaining plate is connected to the first clamping angle and/or the second clamping angle in a fixed position using a fixing means, or simply, a tool or a fixing tool. As a result of a fixing of the retaining plate to the two clamping angles or to one of the two clamping angles, it is ensured that the frame remains in a precision-adjusted position. For this purpose one or more, in particular self-tapping, screws for example can be screwed in between the retaining plate and the first and/or second clamping angle.

Additional features, advantages and effects follow from the exemplary embodiments described below. In the drawings which are thereby referenced:

Figure 1:
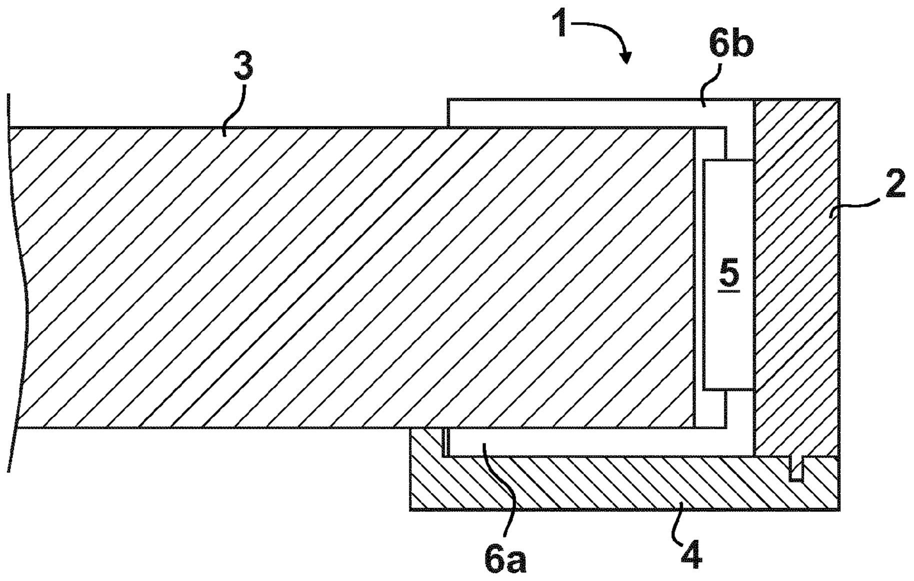
FIG. 1 shows a cross section through a secured frame with a device according to the invention.

FIG. 1 shows a schematic illustration of a device 1 for securing a frame 2 to a wall 3 or in a wall opening, wherein the device 1 is connected to a frame 2, bears against a decorative paneling 4 of the wall 3 on one side, and is clamped to the wall 3 on both sides. In this embodiment, the device 1 comprises a retaining plate 5 as well as two clamping angles 6*a*, 6*b* which respectively bear against the faces of the wall 3.

Figure 2:
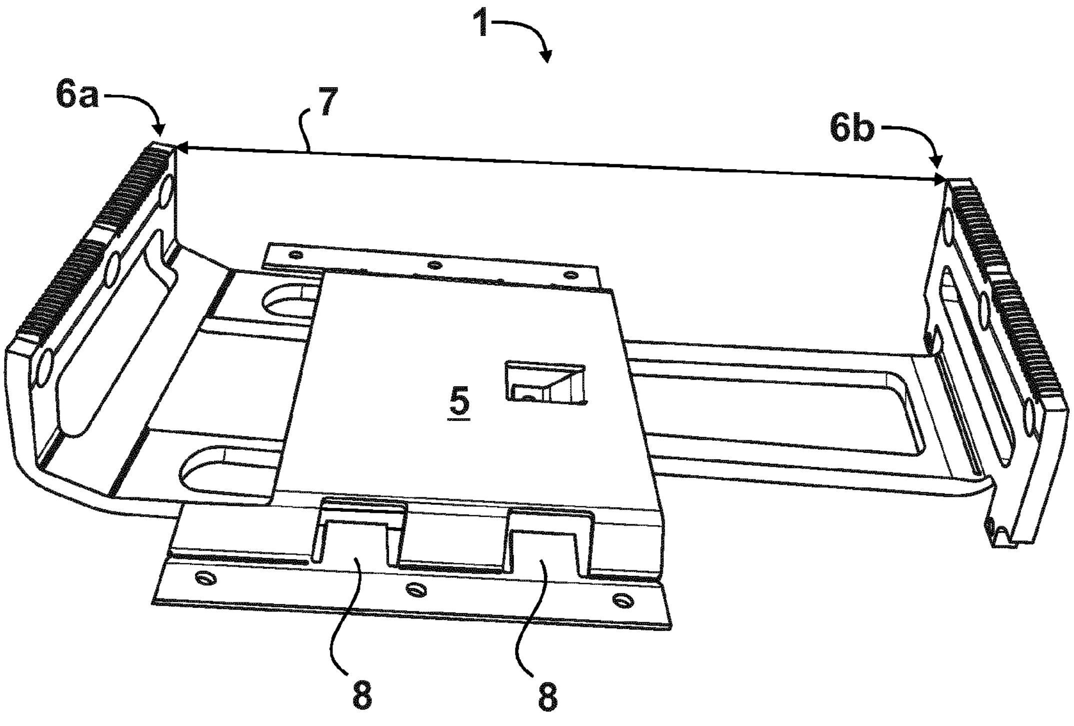
FIGS. 2 and 3 shows the device according to the invention.

FIG. 2 shows the device 1 in a three-piece embodiment, comprising the retaining plate 5 and two clamping angles 6*a*, 6*b*. Alternatively, the device 1 can be embodied to be two-piece, wherein the retaining plate 5 is embodied with an integrated clamping angle 6*a*. The retaining plate 5 is essentially embodied such that it is raised in the center, wherein a first clamping angle 6*a* from one side and a second clamping angle 6*b* from a side across from the first clamping angle 6*a* are slid into or under the retaining plate 5. In the illustration shown, the clamping angles 6*a*, 6*b* have a large span width 7. To keep the clamping angles 6*a*, 6*b* in a proper position and guide them during a sliding-in, the retaining plate 5 comprises multiple guide elements 8. The guide elements 8 are in this case embodied to be flat.

Figure 3:
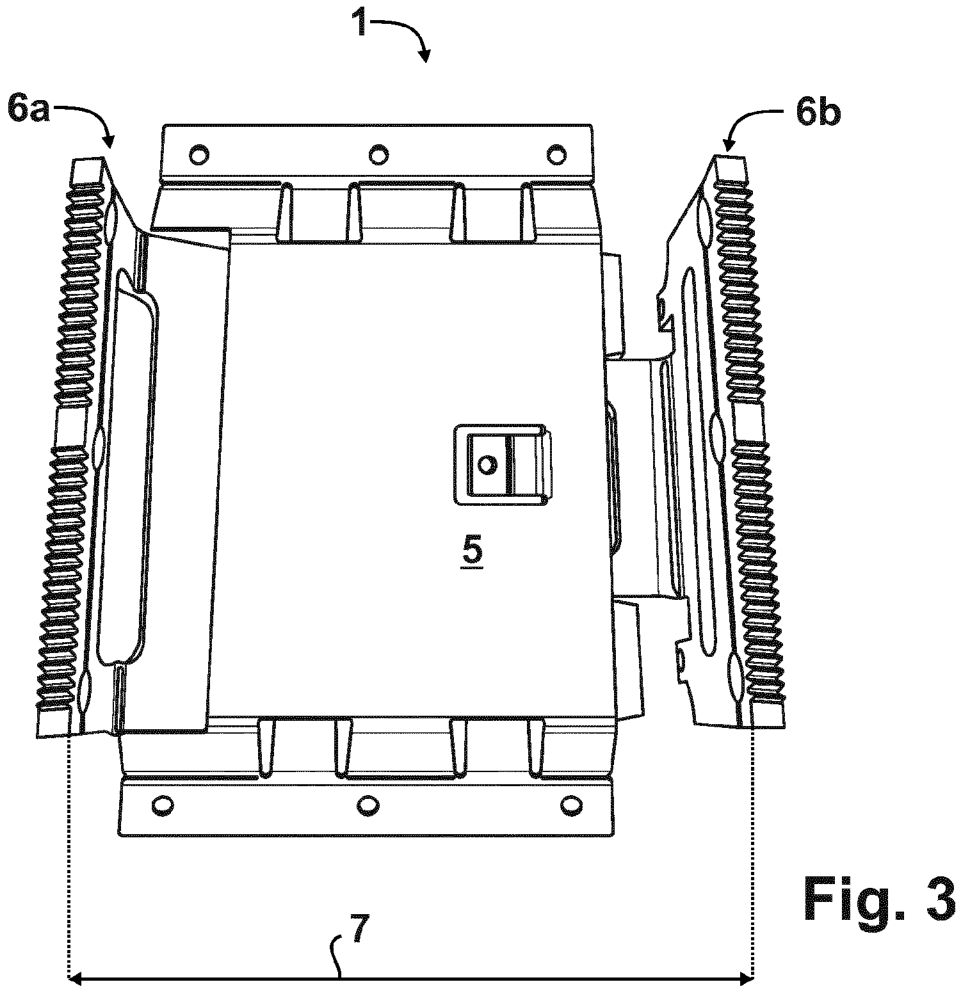

FIG. 3 shows a top view of the device 1, wherein the clamping angles 6*a*, 6*b* have been fully slid into the retaining plate 5, wherein the span width 7 is reduced to a minimum determined by the retaining plate 5. During an installation of the frame 2, this minimum, or the minimum span width 7, is typically defined by a wall thickness.

Figure 4:
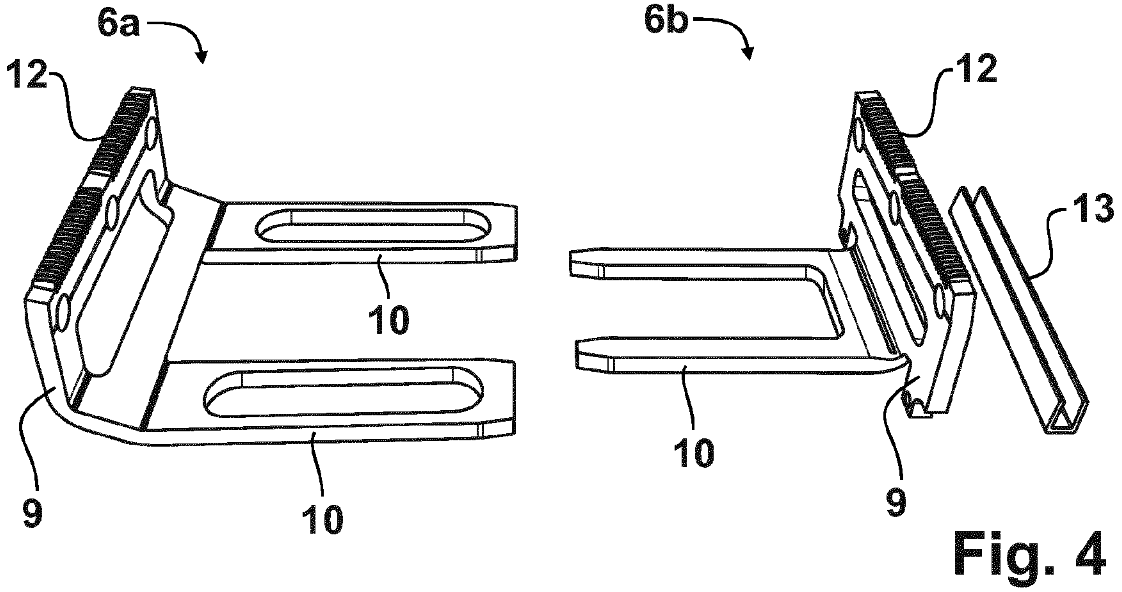
FIGS. 4 through 7 show different views of a first and a second clamping angle.

In FIG. 4, two clamping angles 6*a*, 6*b* are illustrated which each comprises one clamping element 9, or simply clamp 9, and at least one connecting piece 10, or simply connector 10. Here, the first clamping angle 6*a* essentially comprises two planar connecting pieces 10 with one notch each, which connecting pieces 10 are connected by the clamping element 9. The connecting piece 10 of the second clamping angle 6*b* likewise comprises a notch, which is open at one end so that this connecting piece 10 is essentially embodied to be U-shaped, wherein lateral, in particular rod-shaped, parts each have a rectangular cross section. Alternatively, two or more rod-shaped connecting pieces 10 that are connected to one another, preferably by the clamping element 9, can also be provided. The connecting pieces 10 can be embodied in any desired shape, in particular with a rectangular, square, triangular, polygonal, oval, or round cross section. If multiple connecting pieces 10 are provided, different shapes can be combined with one another as desired. However, if only a single rod-shaped connecting piece 10 is provided, then it preferably comprises at least one edge or is embodied to be oval, in order to ensure a rotationally fixed securing.

The notches in the connecting pieces 10 primarily serve to reduce the weight. In addition, at a first end of the first clamping angle 6*a*, typically on the connecting pieces 10, two female threads 11, which are not illustrated, are provided. At a second end, a toothing 12 is provided both on the first and also on the second clamping angle 6*b*, preferably on a top side of the clamping element 9. Additionally, a U-shaped profile 13, such as a rubber cap for example, is illustrated which is advantageously formed from an elastic material, in particular a rubber or silicone. This U-shaped profile 13, or the rubber cap, can be pulled over the toothing 12 to prevent a slipping by the device 1 on a smooth surface such as a tiled wall, for example.

Figure 5:
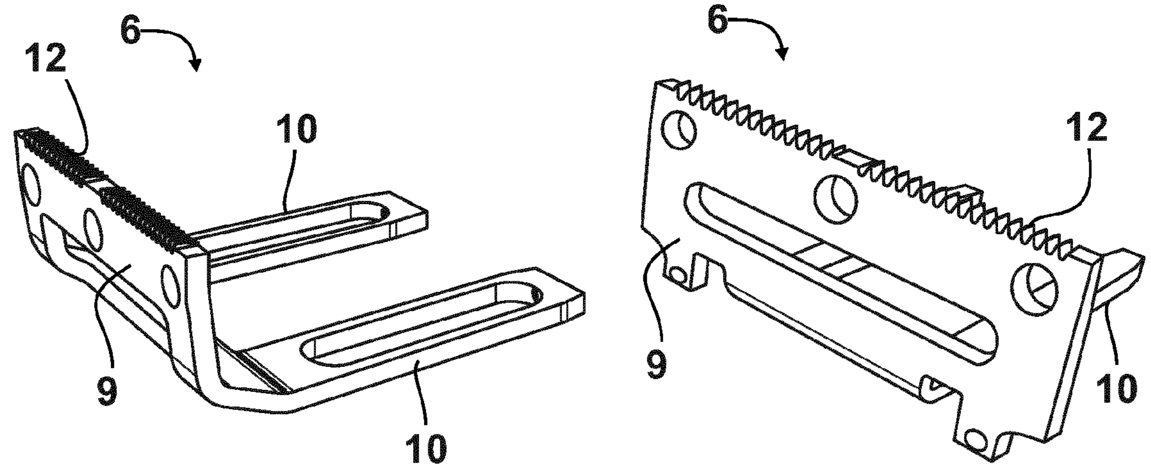

FIG. 5 shows a further illustration of the clamping angles 6*a*, 6*b*, wherein it can be seen that the clamping element 9 and the at least one connecting piece 10 form an angle of approximately 90°. In the illustrated embodiment, the clamping element 9 of the first clamping angle 6*a* is connected to the connecting piece 10 via a segment arranged at a slant. This segment preferably forms an angle between 10° and 80°, typically an angle of 45°, with the clamping element 9 and/or the connecting piece 10. The clamping element 9 of the second clamping angle 6*b* is in this case directly connected to the connecting piece 10, wherein a connection point is embodied in a curved manner.

Figure 6:
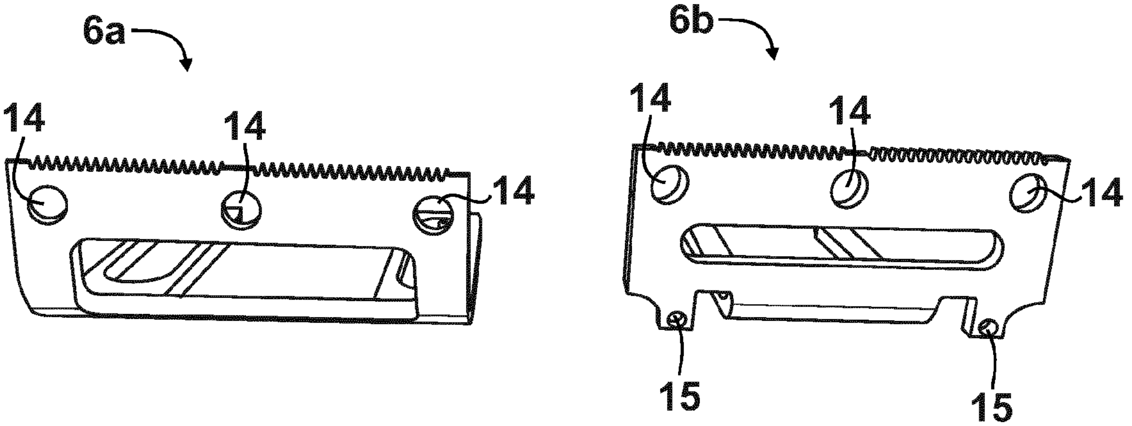

FIG. 6 shows a front view of the clamping angles 6*a*, 6*b* with the clamping elements 9 in the foreground, wherein the clamping elements 9 comprise multiple holes 14 for securing or receiving a fixing means. On the one hand, these holes 14 serve to reduce the weight and, on the other hand, a fastening screw, for example, can be screwed into the wall 3 through these holes 14 in order to fix the device 1 to the wall 3. In addition, the clamping elements 9 respectively comprise notches which serve to reduce the weight and possibly simplify a handling. Furthermore, on the clamping element 9 of the second clamping angle 6*b*, two connecting holes 15 corresponding to the female thread 11 are provided, through which connecting holes 15 an adjusting means, such as a screw for example, can be screwed into the female thread 11 in order to connect the clamping angles 6*a*, 6*b* to one another and to set the span width 7. Particularly preferably, a maximum span width 7 can be set using the adjusting means, since a distance between the clamping elements 9 can only be increased so far before the second clamping element 9 touches a head of the adjusting means, for example, such as a screw head. Alternatively, a rod-shaped projection with a male thread can be provided on the at least one connecting piece 10 in place of the female thread 11, for example, which projection can be guided through the connecting hole. A nut can be screwed onto the projection to set a span width 7 in this case. The connecting piece 10 can in particular be embodied to be fully rod-shaped and can comprise a male thread.

Figure 7:
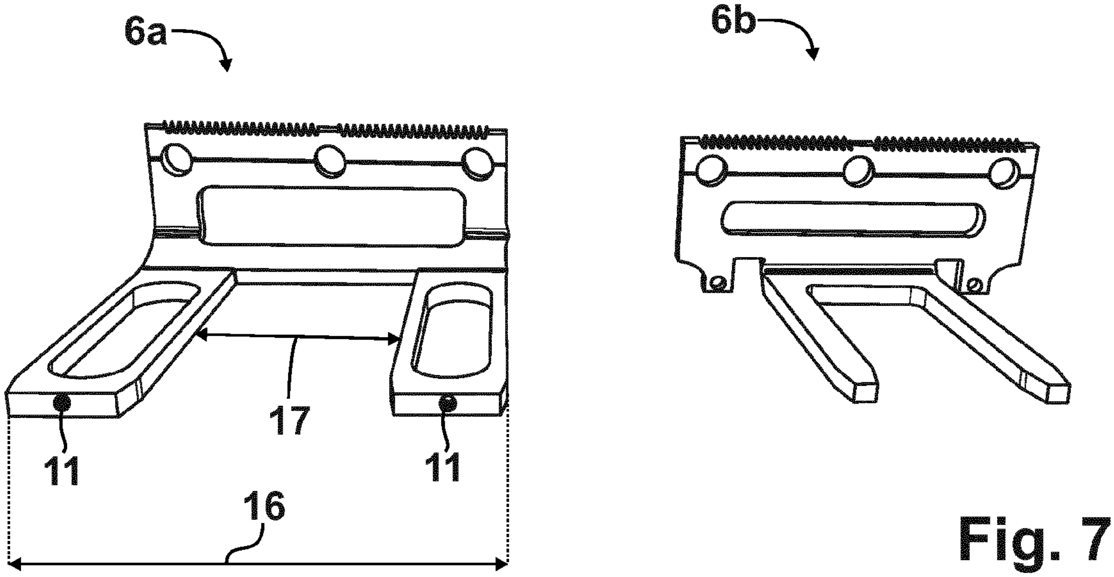

FIG. 7 shows a rear view of the clamping angles 6*a*, 6*b*, wherein the two female threads 11 that are arranged on the face of the connecting pieces 10 of the first clamping angle 6*a* are illustrated. The corresponding connecting holes 15 are provided on the clamping element 9 of the second clamping angle 6*b*. Normally, the connecting pieces 10 of the first clamping angle 6*a* and the second clamping angle 6*b* have a different outer distance 16 or width. Particularly preferably, an inner distance 17 between the connecting pieces 10 of the first clamping angle 6*a* corresponds to the outer distance 16 or width of the connecting piece 10 of the second clamping angle 6*b*. As a result, the second clamping angle 6*b* is guided by the first clamping angle 6*a* when being slid into the retaining plate 5.

Figure 8:
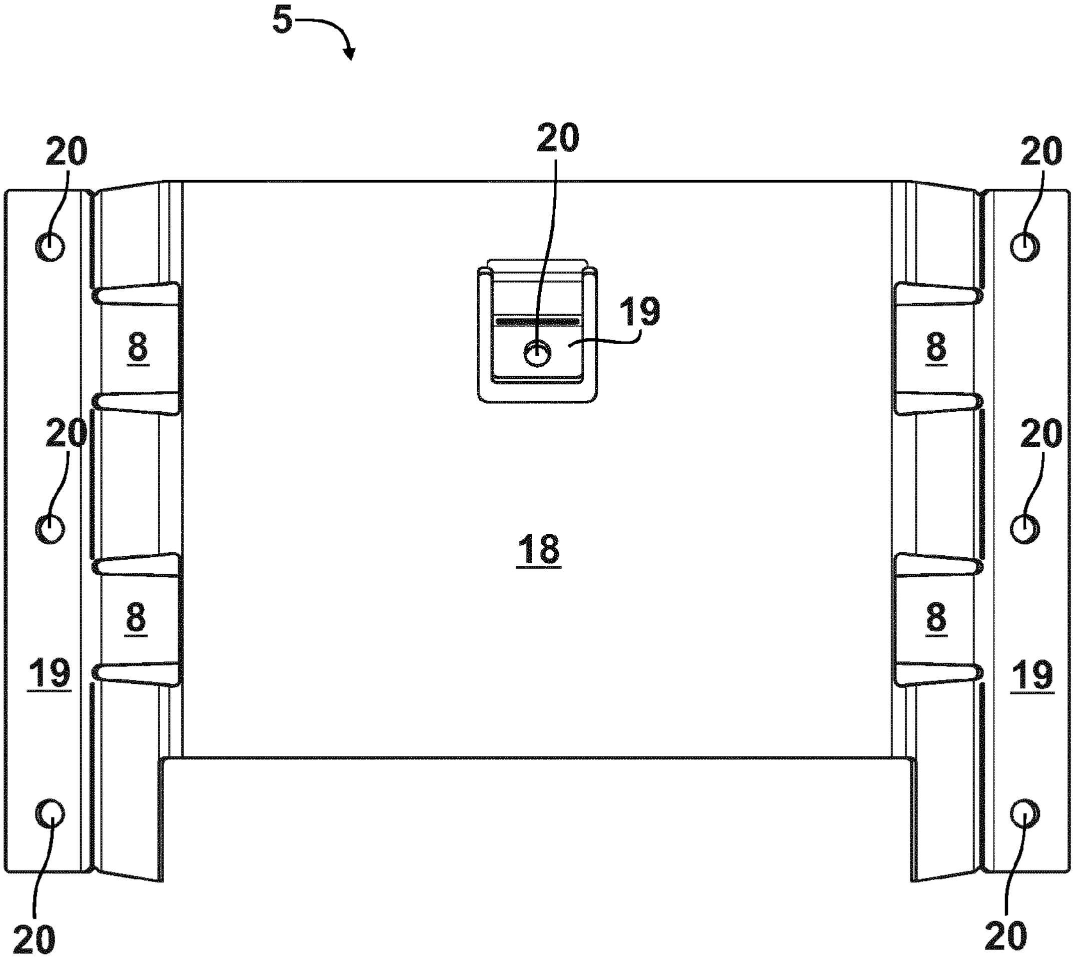
FIGS. 8 through 10 show different views of a retaining plate.

FIG. 8 shows a top view of the retaining plate 5, wherein a central surface 18 is flanked by two contact surfaces 19. In addition, a further contact surface 19 is provided which is arranged centrally in the retaining plate 5. The contact surfaces 19 each comprise at least one mounting hole 20, preferably multiple mounting holes 20. With the aid of the mounting holes 20, the retaining plate 5 can be screwed together with a frame. Furthermore, the retaining plate 5 is respectively embodied to be beveled between the contact surfaces 19 and the central surface 18. In addition, multiple guide elements 8, or simply guides 8, are provided which are used for a guidance of the clamping angles 6*a*, 6*b*, in particular the connecting pieces 10 of the first clamping element 9. When the retaining plate 5 is screwed onto the frame 2, for example through the mounting holes 20, the guide elements 8 of this embodiment also bear against the frame 2. If necessary, the guide elements 8 can also comprise mounting holes 20. Normally, the retaining plate 5 comprises at least two, in particular six, preferably seven mounting holes 20.

Figure 9:
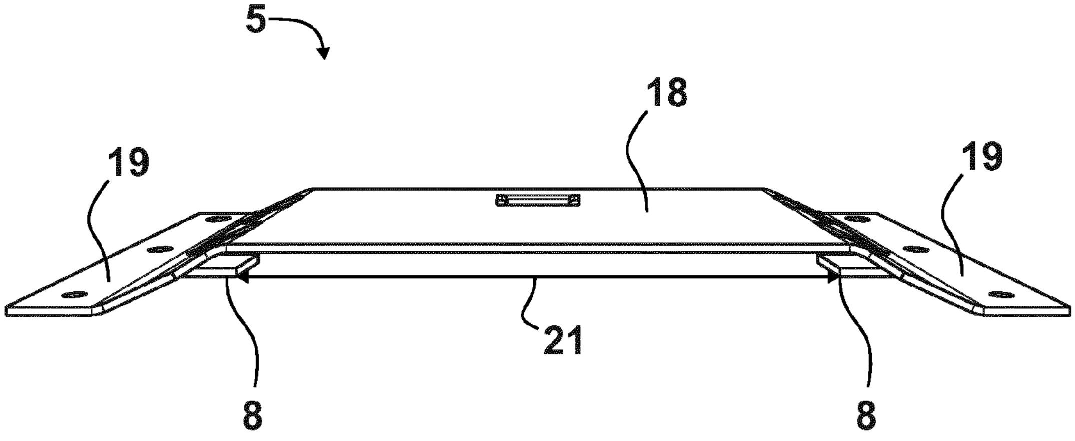

FIG. 9 shows a front view of the retaining plate 5, wherein one beveled connection each is provided between the central surface 18 and the respective contact surface 19. Furthermore, a space into which the clamping angles 6*a*, 6*b* can be slid is provided beneath the central surface 18. Additionally, two guide elements 8 are illustrated.

Figure 10:
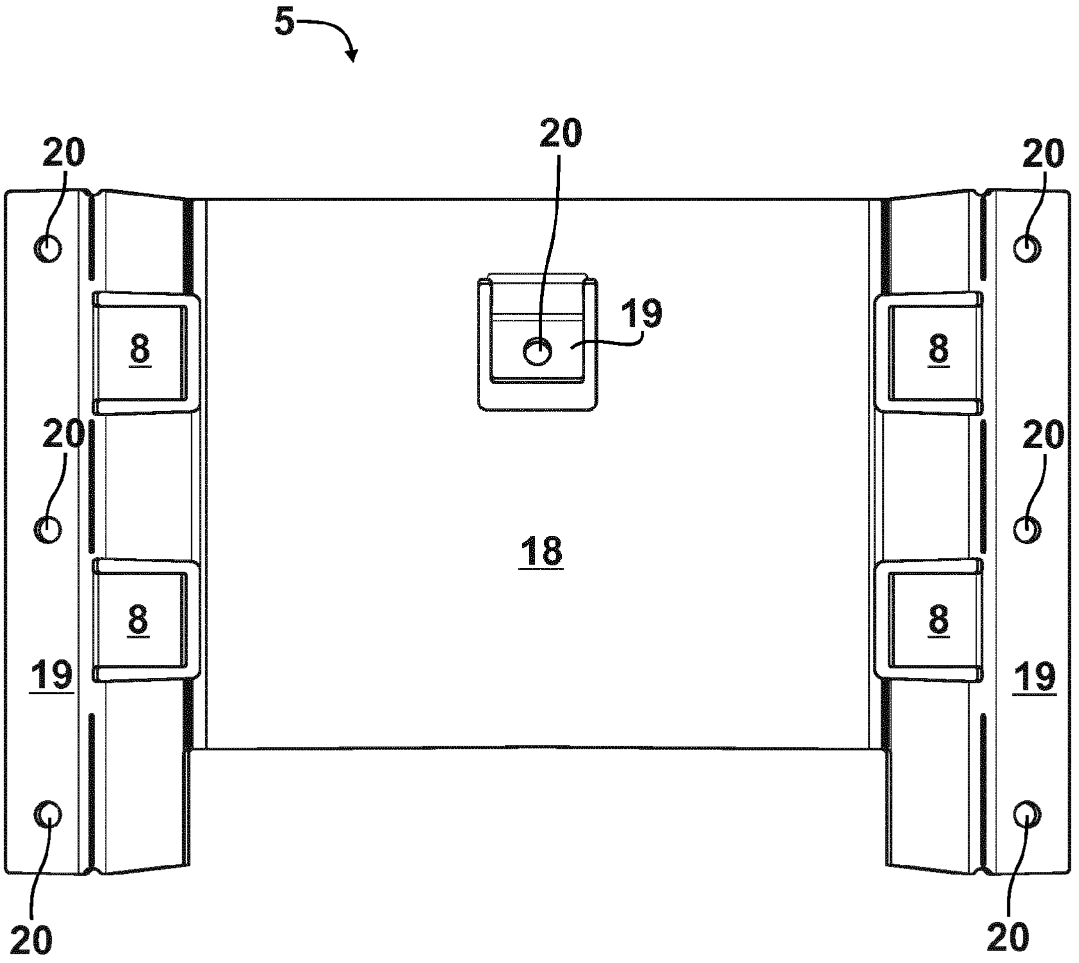

In FIG. 10, a view of a bottom side of the retaining plate 5 is illustrated. In this case, the guide elements 8 are provided such that they adjoin lateral contact surfaces 19 and as a widening of the contact surfaces 19 in some places. Typically, a distance between two opposing guide elements 8, or a guide width 21, roughly corresponds to a width of the connecting piece 10 or the outer distance 16 between the connecting pieces 10 of the first clamping angle 6*a*. It is thus ensured that the first clamping angle 6*a* is guided in a proper position and does not become wedged. Furthermore, the retaining plate 5 preferably comprises a notch that also serves to reduce the weight.

With a device 1 according to the invention, such as that illustrated in FIG. 1 through FIG. 10, a frame 2 can be secured to a wall 3 or in a wall opening in a simple manner.

For this purpose, with the device 1 embodied in three pieces the first clamping element 9 is connected to the retaining plate 5 in a first step. The first clamping element 9 can thereby be slid into the retaining plate 5, for example, and can be clamped preferably between the guide elements 8. This first step is eliminated for the device 1 embodied in two pieces, since the retaining plate 5 is already embodied with an integrated clamping element 9.

The retaining plate 5 is then secured to the frame 2, in particular to an inner side of the frame 2. It has proven effective that the retaining plate 5 be screwed onto the frame 2. Alternatively, the retaining plate 5 can be glued together with the frame 2. To mount the frame 2 in the most gap-free manner possible, the clamping element 9 is in this case preferably positioned against a rabbet or decorative paneling 4 of the frame 2.

In a further step, the frame 2 is inserted into the corresponding wall opening and the first clamping angle 6*a* is positioned with the clamping element 9 thereof against a first face of the wall 3. On a side of the retaining plate 5 across from the first clamping angle 6*a*, the second clamping angle 6*b* is then, as shown in FIG. 1 and FIG. 2, slid between the retaining plate 5 and the frame 2 until the clamping element 9 of the second clamping angle 6*b* bears against a second face of the wall 3. Alternatively, the second clamping angle 6*b* can be slid into a guide channel possibly provided for this purpose. In the case of tiled walls or other smooth surfaces, the U-shaped profile 13 or the rubber cap is normally pulled over the toothing 12 of the clamping element 9.

After this, screws can be screwed into the female thread 11 through the connecting holes 15 in order to connect the two clamping angles 6*a*, 6*b* to one another. The span width 7 is thus reduced, whereby the device 1 is clamped in place, preferably lightly, on the wall 3. At this point, the frame 2 can still be trued or adjusted, since the mounting plate 5 can be shifted relative to the clamping angles 6*a*, 6*b*.

Once the frame 2 has been trued and/or straightened, the screws are screwed further into the female thread 11 in a next step until the span width 7 is at a minimum and, accordingly, a clamping force is at a maximum. Here, the minimum of the span width 7 is defined by a wall thickness. In the three-piece embodiment of the device 1, the frame 2 can then be readjusted, especially if the retaining plate 5 and the first clamping angle 6*a* are not connected in a fixed position.

Finally, a fastener can be introduced between the retaining plate 5 and the clamping angles 6*a*, 6*b* so that the retaining plate 5 is connected to the clamping angles 6*a*, 6*b* in a fixed position. For this purpose, one screw each, for example a self-tapping screw, is preferably screwed in between the beveled connection and the first clamping angle 6*a*.

Depending on a length of the frame 2, one or more devices 1 are used for the securing, and the individual steps are repeated accordingly for each device 1. For an installation of a door, at least two, in particular three, devices 1 are used on the frame 2, for example, along a long side of the door. One device 1 is typically fixed to the frame 2 along a short side of the door. If necessary, the device 1 along the short side of the door can be omitted.

As a final step, the clamping elements 9 can immediately be covered with a decorative paneling 4, molding, or trim, and a visually appealing installation of the frame 2 can thus be completed. To remove the frame 2 in a non-destructive manner, all connections can simply be undone and the frame 2 can be removed from the wall opening.

The invention claimed is:

1. A device for securing a door frame to a wall, the device comprising:

a three-separate-part securing system comprising a retaining plate and two cooperating clamping angles;

the retaining plate comprises at least one horizontal guide channel for the first and second clamping angles;

wherein the two cooperating clamping angles comprise a first clamping angle and a second clamping angle, the first and second clamping angles are arranged on the retaining plate such that each of the first and second clamping angles being configured to be shifted in relation to the retaining plate and thereby change a span width of the first and second clamping angles;

wherein the two cooperating clamping angles are arranged on the retaining plate in a rotationally fixed manner;

each of the two cooperating clamping angles comprises at least one planar clamp and at least one connector, the at least one connector configured to be guided within the horizontal guide channel;

the first clamping angle comprises at least one female thread each configured to receive a respective positioner;

the second clamping angle comprises at least one connecting hole corresponding respectively to the at least one female thread;

wherein the retaining plate of the three-separate-part securing system is configured to be secured to a part of the door frame; and wherein the first and second clamping angles of the three-separate-part securing system are configured to be directly secured to the wall.

2. The device according to claim 1, wherein:

the at least one planar clamp and at least one connector form an angle of approximately 90°.

3. The device according to claim 1, wherein:

the at least one connector has a cross section which is essentially polygonal.

4. The device according to claim 1, wherein:

the at least one connector has a cross section that is essentially rectangular.

5. The device according to claim 1, wherein:

the at least one female thread is at a first end of the first clamping angle.

6. The device according to claim 1, wherein:

each of the at least one positioner is a screw.

7. The device according to claim 1, wherein:

at least one of the planar clamps comprises multiple holes configured to receive one fastener each.

8. The device according to claim 1, wherein:

the retaining plate comprises a central surface flanked by two contact surfaces; and the retaining plate is beveled between the central surface and respective ones of the contact surfaces.

9. The device according to claim 1, wherein:

each of the clamping angles comprises a toothing on an end of the clamp.

10. A method of securing a door frame to a wall with the device of claim 1, said method comprising:

arranging the first and second clamping angles on the retaining plate so that the first and second clamping angles are rotationally fixed to the retaining plate.

11. A method of securing a door frame to a wall with the device of claim 1, said method comprising:

connecting the first clamping angle to the retaining plate;

securing the retaining plate to an inner side of the door frame;

inserting the door frame into a wall opening;

connecting the second clamping angle to the retaining plate in a rotationally fixed manner across from the first clamping angle;

connecting the first clamping angle and the second clamping angle using at least one positioner to reduce the span width until a sufficient clamping force on the wall is reached in order to fix the door frame to the wall.

12. The method according to claim 11, further comprising:

using the at least one horizontal guide channel, sliding in between the retaining plate and the door frame the at least one connector of the second clamping angle.

13. The method according to claim 11, further comprising:

aligning the door frame before the span width is reduced.

14. The method according to claim 11, further comprising:

aligning the door frame before the span width is reduced to a minimum.

15. The method according to claim 11, wherein:

when the retaining plate is connected to the first clamping angle and to second clamping angle in a fixed position, a fixer is used.

16. The method according to claim 11, wherein:

the retaining plate is first secured to a securing frame for a door and the clamping angles are inserted thereafter.

17. The device according to claim 1, wherein:

the retaining plate and the two cooperating clamping angles of the three-separate-part securing system are movable with respect to each other.

* * * * *